(12) United States Patent
Brockhoff et al.

(10) Patent No.: US 8,857,869 B2
(45) Date of Patent: Oct. 14, 2014

(54) BUMPER SYSTEM FOR A VEHICLE

(71) Applicant: Benteler Automobil Technik GMBH, Paderborn (DE)

(72) Inventors: Franz Ulrich Brockhoff, Bramsche (DE); Frode Paulsen, Gjovik (NO); Havard Sorlie, Oslo (NO)

(73) Assignee: Benteler Automobiltechnik GmbH (DE)

( * ) Notice: Subject to any disclaimer, the term of this patent is extended or adjusted under 35 U.S.C. 154(b) by 39 days.

(21) Appl. No.: 13/680,513

(22) Filed: Nov. 19, 2012

(65) Prior Publication Data

US 2013/0127189 A1 May 23, 2013

(30) Foreign Application Priority Data

Nov. 21, 2011 (DE) .......................... 10 2011 118 945

(51) Int. Cl.
*B60R 19/18* (2006.01)
*B60R 19/48* (2006.01)

(52) U.S. Cl.
CPC ........... *B60R 19/18* (2013.01); *B60R 2019/486* (2013.01); *B60R 19/48* (2013.01)
USPC ...................................................... 293/113

(58) Field of Classification Search
CPC B60R 19/18; B60R 19/34; B60R 2019/1866; B60R 2019/1873; B60R 2019/247; B60R 2019/264; B60R 19/02; B60R 19/36; B60R 19/38; B60R 19/42; B60R 2011/004; B60R 2011/0057; B60R 2019/005; B60R 2019/188; B60R 2019/262; B60R 2019/486; B60R 2019/522; B60R 2021/0004; B62D 29/001; B21D 53/88; B60D 1/485; B60D 1/56
USPC ......... 293/113, 102, 120, 115, 117, 121, 122, 293/132, 151, 150, 154; 296/187.03, 146.6
See application file for complete search history.

(56) References Cited

U.S. PATENT DOCUMENTS

| 4,072,334 | A | * | 2/1978 | Seegmiller et al. | ........... 293/110 |
| 6,165,588 | A | * | 12/2000 | Wycech | .......... 428/122 |
| 6,290,272 | B1 | * | 9/2001 | Braun | ........... 293/120 |
| 6,318,773 | B2 | * | 11/2001 | Storer | ........... 293/115 |
| 6,371,540 | B1 | * | 4/2002 | Campanella et al. | ......... 293/102 |
| 6,767,039 | B2 | * | 7/2004 | Bird | ............. 293/154 |

(Continued)

FOREIGN PATENT DOCUMENTS

DE 10 2007 025 726 A1 4/2008
DE 102007025726 12/2008

(Continued)

*Primary Examiner* — Glenn Dayoan
*Assistant Examiner* — Sunsurraye Westbrook
(74) *Attorney, Agent, or Firm* — Sheridan Ross P.C.

(57) ABSTRACT

Bumper system for a motor vehicle with a cross member which is arranged cross to longitudinal members and having a top side, a bottom side, a front side and a back side and with at least one means to ensure adequate energy impact into the cross member 2 characterized in that at least one means on the top side and/or on the bottom side of the cross member is arranged in that way that it is pointing away from the cross member wherein air can stream at least partially through a region above and/or beneath the cross member during driving of the motor vehicle.

20 Claims, 6 Drawing Sheets

(56) References Cited

U.S. PATENT DOCUMENTS

| | | | |
|---|---|---|---|
| 7,066,525 B2 * | 6/2006 | Jaeger et al. | 296/102 |
| 7,303,219 B2 * | 12/2007 | Trabant et al. | 293/155 |
| 7,340,833 B2 * | 3/2008 | Weissenborn et al. | 29/897.2 |
| 7,510,232 B2 * | 3/2009 | Fortin | 293/143 |
| 2002/0047281 A1 * | 4/2002 | Hartel et al. | 293/102 |
| 2004/0108737 A1 * | 6/2004 | Evans | 293/117 |

FOREIGN PATENT DOCUMENTS

| | | |
|---|---|---|
| DE | 10 2008 028 379 A1 | 3/2009 |
| DE | 102008025379 | 12/2009 |
| EP | 2 082 924 A1 | 7/2009 |

* cited by examiner

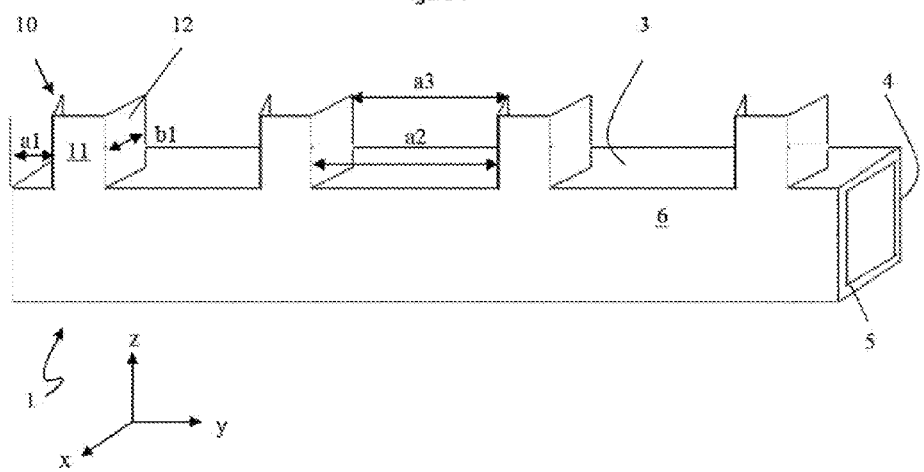
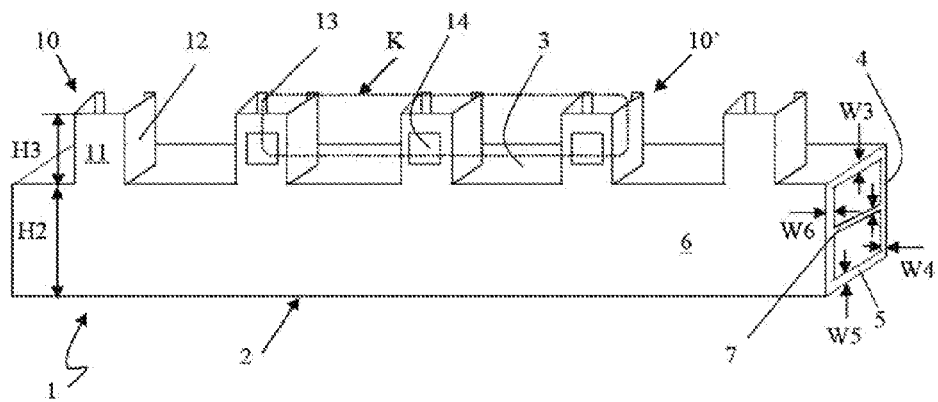

ly BUMPER SYSTEM FOR A VEHICLE

CROSS REFERENCE TO RELATED APPLICATIONS

This application claims the benefit of German Application No. 10 2011 118 945.2, filed Nov. 21, 2011, the entire disclosure of which is incorporated herein by reference.

The invention relates to a bumper system for a motor vehicle comprising a crossmember which is arranged transversely to the vehicle longitudinal members and which is substantially formed from an upper face, a lower face, a front face and a rear face, and comprising at least one guide means for introducing force into the crossmember during an impact, with a vertical covering which is reduced or absent.

The problem is intensified with the increasing prevalence of large and/or tall motor vehicles such as SUVs, MPVs in road transport and at the same time the trend for smart vehicles in large cities, as well as sports cars. It is important in terms of performance that, in the event of a front and rear impact, the components and sub-assemblies substantially provided for energy dissipation are able to cooperate in an optimal manner. In order to be able to introduce, therefore, the impact energy in an optimal manner, the points of impact on both vehicles which are generally the crossmembers of the bumper systems, should be covered by 100%. Naturally, however, the design of a smart vehicle does not permit a constructional space which is comparable with a large executive vehicle or SUV vehicle, so that automatically the body structure as a whole and specifically the deformation elements, longitudinal members and crossmembers are offset in terms of height on the vehicle front or rear. In Europe, for example, all vehicles also have to meet the test criteria according to the ECE list of regulations, including regulation R 42 for front and rear protective devices, wherein a test pendulum strikes at a predetermined height against the bumper system of a vehicle to be tested and, amongst other things, the deformations in the front and rear regions are measured.

Such systems have already become known. Thus, DE 10 2004 050 435 A1 discloses a bumper system which takes into account the requirements for compatibility between vehicles of different size classes and/or vehicle heights. To this end, it is proposed to fasten a guide means to two crossmembers arranged at different heights, wherein the guide means serves for connecting the crossmembers and for introducing force into the crossmembers in the event of an impact with an obstacle. A drawback here is that a large amount of constructional space and material and thus mass has to be provided which also results in a considerable cost in mounting such a bumper system.

It is also known to provide guide means to be mobile as an underride protection, which in the case of an imminent impact are extended upwards or downwards as a result of an incident and are intended to reduce the effect of injury and damage. A drawback here is the high mechatronic complexity and cost in terms of production technology for implementing such a system as well as the risk of unnecessary damage when triggered spuriously.

Moreover, bumper systems are known for compensating for the height difference of the crossmembers of two vehicles of low compatibility —with regard to a front or rear impact— comprising a guide means which is secured as a separate component to the upper face or the lower face of a crossmember. Said guide means may, for example, prevent driving below an opposing higher and/or larger motor vehicle. This solution, however, has the significant drawback that the guide means has a high weight and is barely suitable for the front region due to insufficient air penetration and represents a high additional weight.

It is the object of the invention, proceeding from the disclosed prior art, to provide a bumper system with a vertical covering which is reduced or absent relative to the other party involved in the accident, which in the event of an impact ensures a sufficient introduction of force into the crossmember and the further energy-absorbing parts of the vehicle body with at the same time sufficient throughflow of air, at least in the region of the radiator. The costs and/or the weight of the bumper system are intended to be reduced thereby.

This object is achieved by a bumper system according to the features of claim 1. Advantageous variants of the invention may be derived from the features of the sub-claims.

According to the invention, a bumper system is proposed which comprises a crossmember and at least one guide means, wherein the crossmember connects the vehicle longitudinal members together and is formed from an upper face, a lower face, a front face and a rear face, and wherein at least one guide means is provided for introducing force into the crossmember in the event of an impact, with a vertical covering which is reduced or absent, characterized in that at least one guide means is arranged on the upper face and/or on the lower face of the crossmember, facing away from the crossmember, wherein air is able to flow at least partially through a region above and/or below the crossmember during travel. A characteristic of the bumper according to the invention is that air is able to flow at least partially through the region of the guide means which is located on the upper face and/or lower face of the crossmember. In this case, it is possible within the scope of the invention that at least one guide means is itself designed for the throughflow of air or a plurality of guide means are arranged spaced apart from one another such that in the intermediate space thereof a sufficient throughflow is able to take place during travel. Naturally, a combination of both principles may also be provided.

In particular, the bumper system comprises at least one guide means which during travel is configured so that air is able to flow at least partially through said guide means. To this end, apertures may be provided in the guide means which, depending on the surface, the spacing and/or number of individual guide means, may be designed to be of different sizes. However, it is important that sufficient air is able to flow through those guide means which are arranged level with the vehicle radiator. Naturally, it may also be provided that the apertures may be dispensed with when a sufficiently large spacing is present between the individual guide means. As a simple guide, it may be provided that relative to the surface of said region above and/or below the crossmember, which is mounted in front of the radiator and conceals said radiator, at least 50%, preferably at least 65%, is designed for the throughflow of air in order to ensure sufficient cooling management of the vehicle. The surface through which air is able to flow should, however, not exceed 90% of the region mounted in front of the radiator in order to be able to ensure an acceptable level of stability and introduction of force into the crossmember.

Advantageously, a plurality of guide means are located on the upper face or the lower face of the crossmember, firstly to ensure a uniform introduction of force into the crossmember which is optimized in terms of load, and secondly, in the case of guide means without apertures, to permit sufficient spacings between the individual guide means for the throughflow of air. In the first-mentioned aspect it is important that in addition to the central impact with a 100% horizontal covering of the vehicle by the obstruction, by guide means additionally positioned according to the invention at the ends of the crossmember, the horizontal offset impact is also covered, for example, with only a 40% covering.

It is advantageous if at least one guide means protrudes at least partially vertically from the upper face or the lower face. As a result, firstly a particularly simple manufacture and/or mounting of the guide means may be implemented on the crossmember, secondly the uniform geometry also results in advantages when fastening pedestrian protection elements, for example made of foam, thin slotted metal sheets or rubber.

It is particularly advantageous in this regard if at least one guide means terminates flush with the front face of the crossmember. Most preferably, no guide means protrude over the front face of the crossmember.

It is, however, also possible that the at least one guide means on the crossmember, proceeding from the front face, at least partially extends in the direction of the rear face and at the same time extends from the upper face upwards or from the lower face downwards. By means of this arrangement, in specific cases in which a vehicle design which terminates in a particularly narrow, low and flat manner is required in the front region, for example in order to achieve an exceptionally low wind resistance, the safety requirements may also be met, which otherwise would only be possible with additional expensive active protection systems.

Naturally, it may also be provided that the at least one guide means, but particularly preferably all guide means, protrude on the upper face and/or the lower face, such that a progressive, degressive or linear path is produced towards one free end of the guide means facing away from the crossmember. The path may vary depending on the pedestrian protection means used and further attachments in the front region of the motor vehicle, but it is essential that the guide means ensures a sufficient introduction of force into the bumper in the event of an impact with a vertical covering which is reduced or absent. In the case of guide means with a free end, the wall thickness has to be selected to be correspondingly greater or the path of the guide means has to be selected such that the obstacle strikes the guide means itself in the manner of an impact. This is, for example, possible by a path oriented partially to the front in the direction of travel.

A further essential feature of the invention provides that at least one guide means is shaped as an integral component of the crossmember. Particularly preferably, all guide means are formed integrally from the material of the crossmember. This has the advantage that joining operations may be dispensed with as far as possible and thus the influence of heat with its negative consequences on the material is avoided. Moreover, corrosion and tolerance problems are not relevant in this case.

By way of example, at this point a method for producing a simple variant of the bumper system according to the invention is intended to be described. Proceeding from a rectangular tubular profile with an additional freely protruding flange-like wall, which is produced by roll forming, extrusion or the like, a first cutting operation takes place to cut the profiles to length and one or more cutting operations in which the freely protruding flange-like wall is partially separated, then in the following bending operation partial regions of the wall are bent back in the same direction and the regions located between the unbent regions remain unaltered.

Preferably, at least one guide means is shaped at least partially in the extension of the front face, so that the guide means terminates partially flush with the front wall and has the same wall thickness as the front face. In particular, advantages in terms of production technology during the extrusion process are produced thereby with regard to tool design and cooling behavior.

Particularly advantageously, at least one guide means comprises a web portion and flank portions protruding from the web portion in the direction of the rear face of the crossmember, whereby the guide means may be supported on the upper face and/or the lower face of the crossmember in the event of a vertical offset impact and a sufficient introduction of force into the crossmember may be permitted. The flank portions preferably extend at an angle or in an arcuate manner away from the web portion and at least over part of their length are in linear contact with the upper face or the lower face of the crossmember.

In a variant, the bumper system has an unreleasable connection between the flank portions of the guide means and the upper face and/or lower face of the crossmember, in particular by a material connection or positive connection. In the contact region, a thermal joint seam or at least one welded point is provided by simple means, in order to prevent in the event of an impact the flank portions slipping on the upper face and/or the lower face by the web portion bending inwards. To increase the support surface in the contact region, an additional flange may protrude at an angle from the flank portion, preferably said flange is already bent back during the cutting operation, for example by a combination tool.

It is also conceivable, however, to produce a positive connection in the contact region, for example by notches which approximately correspond in shape to the linear flank portions in the contact region and form on both sides a bearing. Also, a specific initial stamping of the guide means in the direction of force introduction might be conceivable, and result, in particular with aluminum crossmembers, in strain hardening which in the case of an impact provides more resistance against the guide means bending back into the upper face and/or lower face and thus provides an advantage. Thus, advantageously, the crossmember is made of an aluminum alloy, in particular from the group of 5000, 6000 and 7000 series wrought alloys according to EN 573-3. Particularly advantageously, both the guide means and the crossmember are made of aluminum. Alternatively, however, other lightweight materials such as a magnesium alloy or a mixture of materials, for example with a plastics reinforcement, may also be used. The bumper system in this case has a crossmember which in its longitudinal extent has a contour adapted to the front vehicle design and/or to the vehicle body shell. Advantageously, the crossmember is formed at least partially in its longitudinal extent in a curved manner.

It is also possible that the end portions or even the connecting portion to the deformation elements additionally or alternatively are flattened in cross section. This has an advantage, in particular, for the deformation behavior of the crossmember, as the start of the deformation may be adjusted locally thereby in a specific manner. In this case, the crossmember of the bumper system has at least one longitudinal groove on the upper face and the lower face, which may serve as a starting point for a deformation during the impact.

A further feature of the invention provides that the crossmember has at least one longitudinal groove on its front face. Said groove produces greater flexural rigidity and thus serves for saving weight. The longitudinal groove may additionally be provided on the rear face which increases the positive effect.

Within the scope of the invention it may also be provided that the guide means is configured in one piece and extends in the longitudinal extent of the crossmember, wherein it is at least partially configured for the throughflow of air. The guide means may in this case be formed from a plastics part molded in one piece, in particular an injection-molded part, wherein the guide means partially protrudes from the upper face and/ or the lower face, in order to ensure a force transmission function and bears partially flat against the upper face and/or lower face, in order to ensure sufficient throughflow of air, at least in the region of the vehicle radiator.

Preferably, the guide means in this case is configured to be strip-shaped and continuous over the longitudinal extent of the crossmember, wherein with its longitudinal edges it is partially in contact with the cross member and is secured thereto, in particular unreleasably. This particularly simple design has proved to be advantageous as a guide means strip may be produced by simple bending operations. The connection of the crossmember and longitudinal member may take place preferably on the upper face or the lower face, such that in those portions of the guide means strip in which it is in contact with the cross member, a material connection at particular points or a linear material connection, in particular by thermal joining, is produced.

In an advantageous embodiment of the invention, it is further provided that the guide means strip terminates the crossmember on one side so that a partial doubling-up of the wall in the contact region between the guide means and the crossmember may be avoided. In particular, the guide means strip in this case also takes on a reinforcing function by closing the open side of the crossmember. In this case, the longitudinal edges of the guide means strip come partially into contact with the free longitudinal edges of the front wall and the rear wall of the crossmember and at the same time form the upper face or the lower face of the crossmember.

It is particularly preferred that the guide means is an integral component of the upper face or the lower face of the crossmember, wherein it at least partially terminates the crossmember in this case, and at least partially protrudes therefrom upwards or downwards at an angle. At an angle of approximately 90 degrees and by forming regions extending horizontally spaced apart from the crossmember, between the rising and falling flank portions of the guide means strip, a path is produced in the vertical longitudinal section which is similar to a rectangular function, whilst an angle of between 0 degree and 90 degrees forms a saw-tooth path. Naturally, it may also be provided that the guide means strip has a path deviating therefrom, for example a meandering or wave-shaped path. It is, however, important that sufficient rigidity and capacity for force transmission is ensured in the event of a vertical offset impact. To this end, the guide means strip is preferably made of a metal material, in particular a steel, preferably a higher-strength steel alloy. In this connection, the high resistance moment of a guide means provided partially with rising and falling flank portions and connected to the cross section is generally advantageous. The greater the width of the guide means strip and/or the crossmember, the thinner the wall of the guide means itself. In this case, the wall thickness of such a guide means made of steel with a tensile strength of approximately 750 N/mm² to 1900 N/mm², is 0-4 mm, preferably 1.5 mm to 2.5 mm, wherein the greater wall thicknesses are used with the lower tensile strengths and/or with particularly heavy motor vehicles, whilst the thinner-walled guide means are used with particularly lightweight vehicles and/or with greater tensile strength values. Generally, it is advantageous if the guide means and the crossmembers consist of the same material, so that problems relating to connecting technology and contact corrosion are avoided. Thus, the bumper system may consist of an aluminum extruded profile which, after the cutting and bending steps, forms both the crossmember and the guide means in one, piece.

When using a high-strength steel sheet and/or steel strip advantageously a roll-formed or compression-molded crossmember may be produced, which as in an extrusion process may also have a free, protruding wall which may be reshaped by cutting and bending steps to form guide means.

Particularly high mechanical strengths, with at the same time low weight however, are produced by using a hot-formed and press-hardened crossmember which may be subsequently connected to guide means, in particular to a guide, means strip.

It is also possible to fasten an aluminum crossmember made of a higher-strength wrought alloy by cold-forming or semi-hot-forming between 150 and 350° C. and to fasten the guide means thereto above and/or below as a one-piece guide means strip, in particular by bonding or braze welding.

Naturally, the design of the crossmember may also be transferred to further impact members in the vehicle. Thus, in particular a door impact member for a side impact with a vertical covering which is reduced or absent between the impact member and the bumper of the opposing vehicle may also be provided with at least one guide means having the same mode of operation. In this case, instead of the air permeability, the capacity for integrating door fittings such as for example window lifter actuating mechanisms and cables, as well as weight-saving takes priority in comparison with a higher impact member.

The invention is described in more detail with reference to the following schematic perspective figures.

The same reference numerals are used for the same or similar parts.

FIG. 1 is a simple variant of a bumper system according to the invention,

FIG. 2 is a further variant of a bumper system according to the invention,

Figure 3:
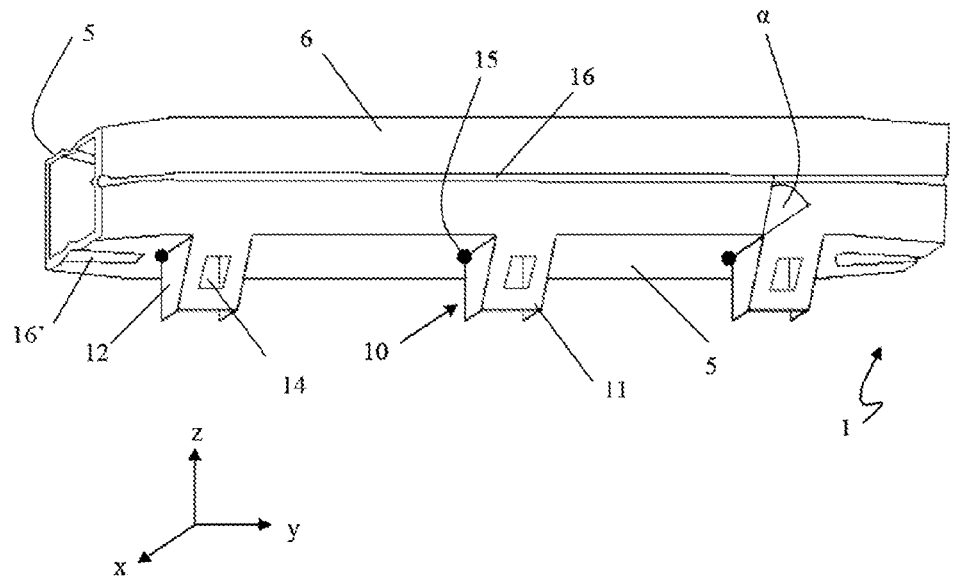
FIG. 3 is a further variant of the invention.

FIG. 1 shows a simple embodiment of a bumper system according to the invention 1 with a crossmember 2 substantially oriented in the Y-direction and with a plurality of guide means 10 arranged on the upper face 3 thereof. The crossmember 2 is rectangular in cross section and forms a double-chamber hollow profile, with a front face 6 facing away from the vehicle in the X-direction, a rear face 4 facing towards the vehicle in the negative X-direction as well as with an upper face 3 and a lower face 5. The guide means 10 are spaced apart from both ends of the crossmember 2 with the spacing a1 and have a spacing a2 relative to one another level with the front wall. The guide means 10 in turn comprise two flank portions 12 facing towards the rear face 4, as well as a web portion 11 which connects the flank portions 12 and is configured to be flush with the front face 6 of the crossmember 2. The flank portions 12 are supported in a linear manner on the upper face 6 of the crossmember 2 and proceeding from the web portion 11 extend away from one another, so that a spacing a3 of the free ends of the flank portions 12 is produced which is smaller than the spacing a2 of two adjacent web portions 11 level with the front wall 6.

Advantageously in this variant, the guide means 10 may be produced by simple cutting and bending operations from a previously formed profile element. Particularly preferably, before said production steps the profile element has a freely protruding wall which is formed as an extension of the front face 6 of the finished crossmember 2 and is partially separated at the height H of the finished crossmember 2 and is then bent back, wherein the bent-back part produces the flank portions 12 and the unbent-back part produces the web portion 11. Thus viewed in reverse in the bent-back portion, the flank portions would close the intermediate space with the spacing a2 between the web portions 11 of the guide means 10, so that approximately a2 equals b, when the cutting width is disregarded.

FIG. 2 shows a further embodiment of a bumper system according to the invention 1 with a crossmember 2 and with a plurality of guide means 10 on the upper face 2 thereof. The crossmember 2 is rectangular in cross section and forms a single-chamber hollow profile with a front face 6 facing away from the vehicle, a rear face 4 facing towards the vehicle, as well as an upper face 3 and a lower face 5. In the inside of the multi-chamber hollow profile a horizontally arranged partition 7 separates both chambers and serves for reinforcing the crossmember 2 in the direction of travel. The wall thickness is designed in this embodiment such that the rear face 4 as well as the partition 7 are designed to be thinner than on the upper face 3, the front face 6 and the lower face 5.

The guide means 10 are spaced apart from both ends of the crossmember 2 by the spacing a1 and have a uniform spacing a2 from one another. The guide means 10 have a height H3, which is dimensioned such that sufficient covering is possible in the event of an impact in spite of the low crossmember height H2 and in spite of a disadvantageous vehicle height. The height H3 should, in particular, be between 15 and 75 mm, depending on the actual crossmember height H2. Preferably, the height of the guide means is between 30 and 50 mm, wherein the greater value being particularly advantageous in a crossmember 2 with H2 of approximately 70 mm and the smaller value being particularly advantageous with a crossmember height H2 of approximately 100 mm.

The guide means 10 in turn comprise two flank portions facing towards the rear face 4, as well as a web portion which connects the flank portions 12 and is configured to be flush with the front face 6 of the crossmember 2.

The flank portions 12 in turn are supported in a linear manner on the upper face 3 of the crossmember 2 and proceeding from the web portion 11 extend away from one another. In each case, flanges 13 are adjoined to the flank portions 12, which substantially protrude perpendicular therefrom and are oriented towards one another. Naturally, it may also be provided that the two flanges 13 of a guide means 10 are oriented facing away from one another.

In both cases, an enlarged surface is produced and thus a reduced local surface pressure on the upper face 3 of the crossmember 2 in the contact region with the end of the flank portions 12 and/or with the end of the flange 13 in the event of an impact with a vertical covering which is reduced or absent.

The wall thickness of the guide means 10 is preferably the same as the wall thickness w6, w3 of the front face 6 or the upper face 3. However, it is also possible to design the guide means 10 to be thinner than the faces 3, 4, 5, 6 of the crossmember 2. It is important, however, that the flank portions 12 and the web portion 11 as well as the flange 13 have the same wall thickness and are formed as an integral component of the crossmember 2.

For sufficient ventilation of the engine compartment in the region K of the partially concealed and, not shown, vehicle radiator, the central guide means 10' comprise apertures 14 for the throughflow of air. Air is not able to flow through the two outer guide means 10, however, as in the exemplary embodiment in FIG. 1.

The region K is the region of the bumper system 1 above the crossmember 2 in which the guide means 10 partially cover the vehicle radiator, not shown.

FIG. 3 shows a further variant of the invention which markedly differs from the variant in FIG. 1. Firstly it differs by the number and design of the guide means 10 themselves. Only three guide means are arranged, which in each case are formed with an aperture 14, wherein the web portion proceeding from the front face extends both upwards and also in the direction of the rear face of the crossmember and in this case encloses an angle a with the lower face. This variant requires that the flank portions are either cut out before the positioning thereof at right angles in the direction of the rear face, such that they bear in the contact region with the upper face in a linear manner, or are additionally bent-back such that they form a contact surface, which becomes increasingly large as a becomes smaller, and the local surface pressure diminishes in the event of an impact with a vertical covering which is reduced or absent.

Secondly, the ends of the crossmember 2 are configured to be flattened. This is expedient, in particular, with aluminum extruded profiles. The flattened portion may, as shown, be formed symmetrically to the central longitudinal plane of the crossmember or also extend in the direction of the vehicle and/or be combined with a curved portion.

A further differentiating feature is the position of the guide means 10. In contrast to FIGS. 1 and 2, said guide means are arranged in FIG. 3 on the lower face 5 and face downwards. In addition to ensuring the introduction of force into the crossmember 2, they also serve, in particular, for preventing driving below a lower obstacle and/or a smaller vehicle in the event of a front or rear impact.

Figure 4:
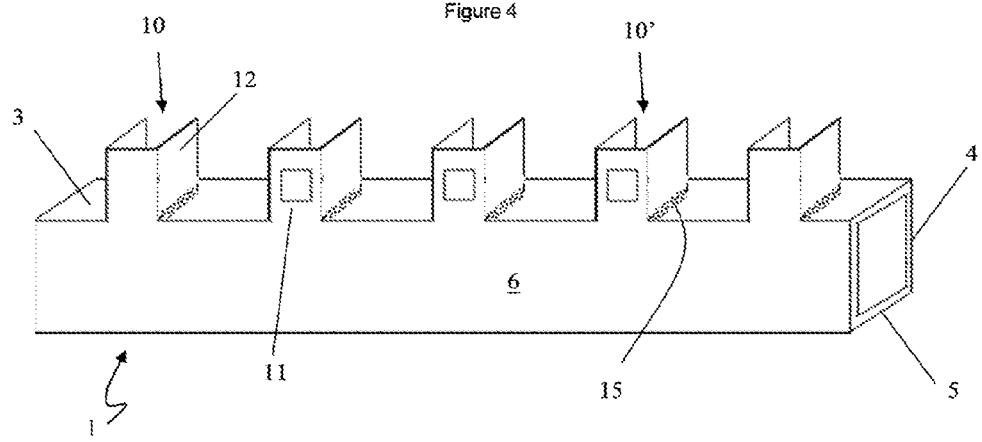
FIG. 4 is a further embodiment of the bumper system according to the invention.

FIG. 4 shows a further embodiment of the bumper system 1 according to the invention, wherein the guide means 10 have a smaller spacing a2 from one another. The central guide means 10' comprise apertures 14 for the throughflow of air during travel. Thus excessive blocking of the radiator and/or shielding of the radiator from the air is prevented. The flank portions of the guide means are secured unreleasably via linear joints 15 to the upper face of the crossmember.

Figure 5:
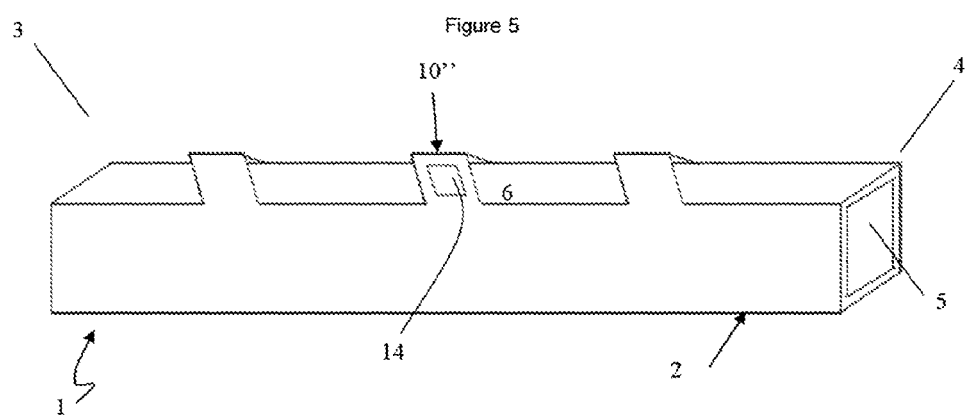
FIG. 5 is a further variant of the bumper system according to the invention.

FIG. 5 shows a further variant of the bumper system 1 according to the invention. Only the central guide means of the three guide means 10, 10' has two apertures 14 for the throughflow of air. All guide means 10" are of U-shaped configuration and protrude at the front over the front face 6 of the crossmember 2 and are supported relative to the rear face 4 of the crossmember 2, wherein the guide means 10" are shaped as an integral component of the crossmember 2. Naturally, instead of an integral shaping by stamping and bending, it may also be provided to produce a plurality of joint connections between the guide means 10" and the crossmember 2. This design has the additional advantage that during a front impact with a vertical covering which is very reduced or absent, the vehicle is prevented from driving under the vehicle of the other party involved in the accident. The guide means 10 thus serve, in particular, as a guide element for the vehicle front of the opposing vehicle.

Figure 6:
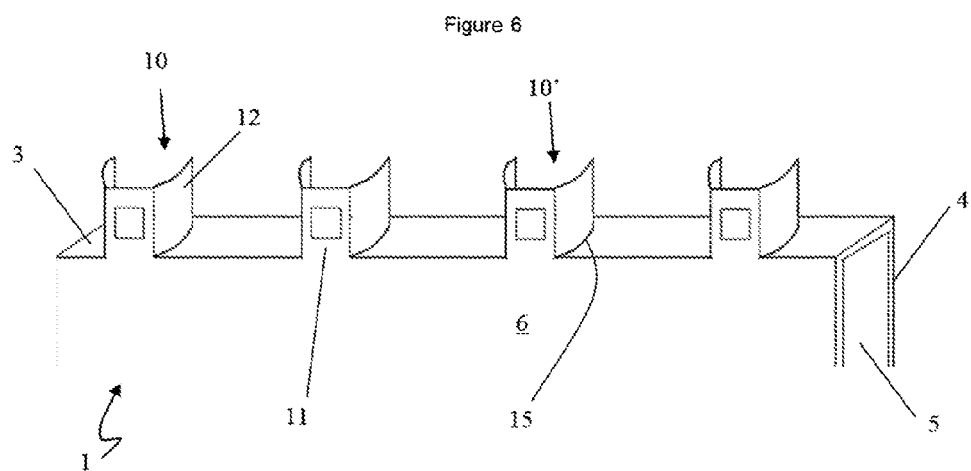
FIG. 6 is a preferred variant of the bumper system according to the invention.

FIG. 6 shows a further embodiment of the bumper system 1 according to the invention, wherein the guide means 10 have apertures 14 for the throughflow of air during travel. Two flank portions are configured in a convex curved manner, proceeding from one respective web portion 11, facing in the direction of the rear face, which results in improved force introduction and support in comparison with linear contact of the upper face of the crossmember during an impact with a vertical covering which is reduced or absent.

Figure 7:
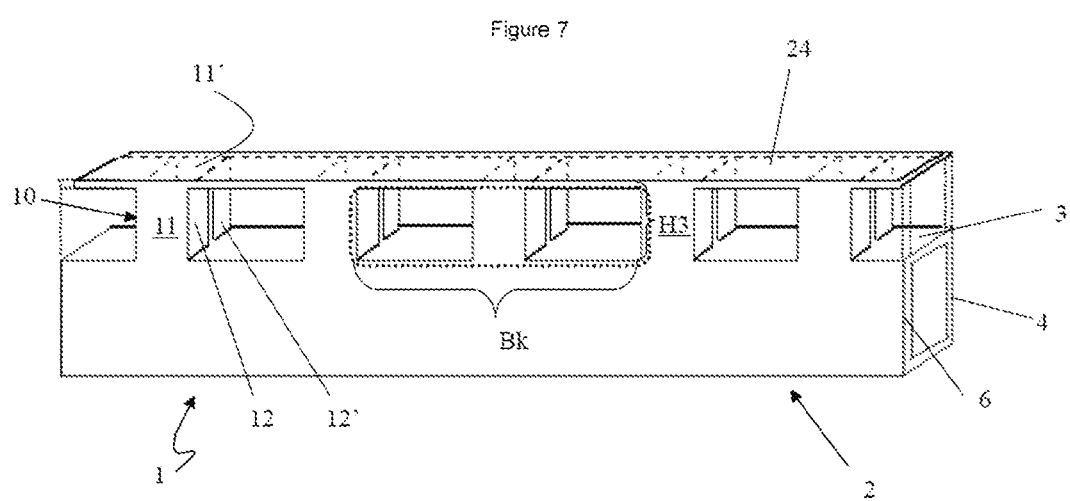
FIG. 7 is a preferred variant of the bumper system according to the invention.

FIG. 7 shows a further embodiment of a bumper system 1 according to the invention. The crossmember 2 has in this case a rectangular hollow profile, as well as on its upper face 3 a plurality of guide means 10—in particular formed from a second hollow chamber of a multi-chamber profile. The guide means 10 in turn have in each case a web 11 extending from the front face 6 of the crossmember, and a web 11' extending from the rear face 4, as well as flank portions 12, 12' extending towards one another away from the two webs 11, 11', which oppose one another at an obtuse angle on the front face. Naturally, it may also be provided that the flank portions 12, 12' partially or entirely overlap. The—in particular shaped—guide means 10 are connected together on their upper face via an additional wall 24, wherein the additional wall 24 is formed in particular from the upper face of an originally present, untreated multi-chamber profile indicated by dashed lines. The additional wall 24, similar to a partition 7, serves for increasing the flexural rigidity in the X-direction.

The region K is the region of the bumper system 1 above and/or below the crossmember 2, in which the guide means 10 partially cover the vehicle radiator, not shown. The region is defined by its height hk and the width bk, wherein the height hk corresponds to the height h3 of the guide means plus the wall thickness of the additional wall 24, and the width bk approximately corresponds to the radiator width.

Figure 8:
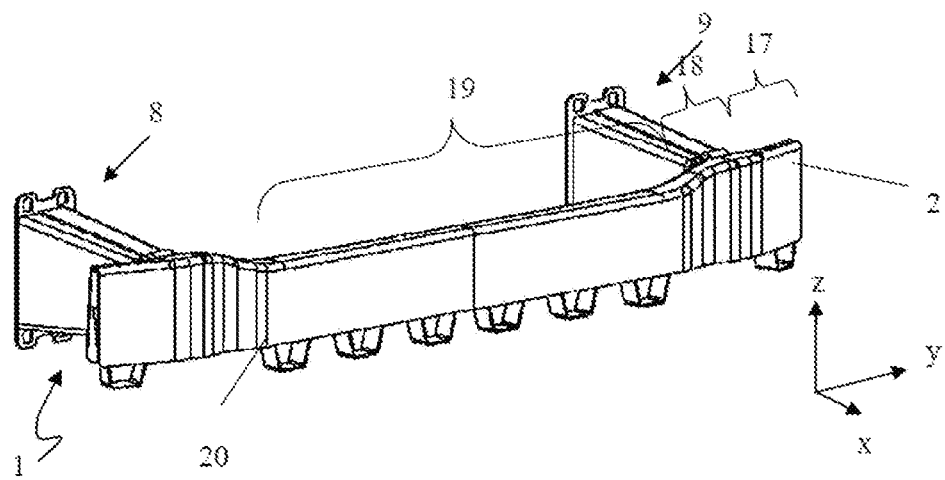
FIG. 8 is a detailed view of the crossmember of FIG. 7.

FIG. 8 shows a further preferred variant for a bumper system according to the invention. A crossmember 2 formed in a substantially U-shaped manner is positioned transversely to two deformation elements 8 and is coupled thereby to vehicle longitudinal members, not shown. On the lower face 5 of the crossmember 2, guide means 20' may be seen, which protrude downwards beyond the crossmember 2, and in each case comprise a rising and falling flank portion 22 and a lower web portion 21 extending parallel and spaced apart from the crossmember 2. The web portion 21 connects both flank portions 22. The two guide means 20' positioned at the ends of the crossmember primarily serve for fulfilling the offset crash requirements, whilst the centrally positioned guide means 20' serve for a positive influence in the event of a central collision with a vertical covering which is reduced or absent.

Figure 9:
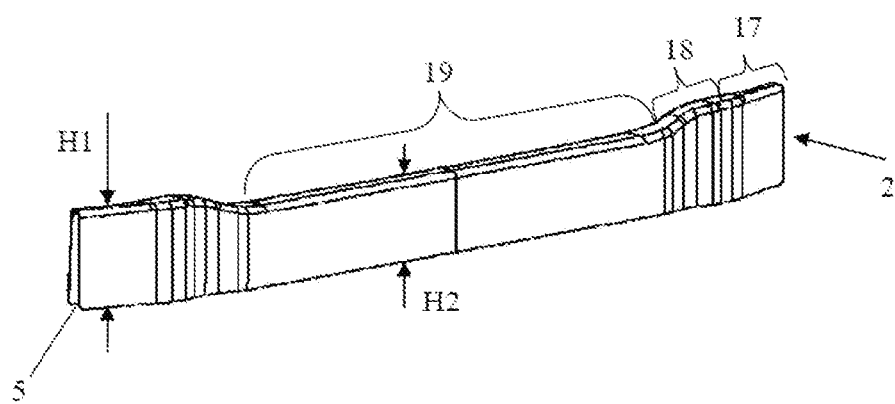
FIG. 9 is a detailed view of the guide means of FIG. 7.

In FIG. 9 the crossmember 2 of FIG. 8 is exclusively illustrated which, in contrast to the previous variants, is configured as a component which is open on the lower face 5 and U-shaped in cross section. The height H2 of the crossmember 2 is in this case greater in a central portion 19 than the height H1 in its end portions 17. The connection to the deformation element 8, 9 takes place in the transition portion 18 which has a continuous vertical path. Additionally, it may be seen that the end portions 17 are arranged offset relative to the central portion 19 towards the vehicle. This offset may be advantageous or even necessary, depending on the front-end design of the vehicle.

Figure 10:
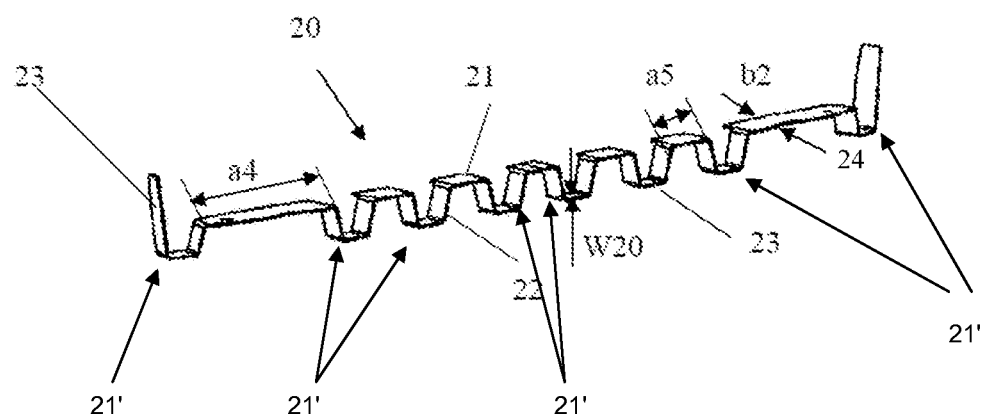
FIG. 10 is a further variant of the bumper system according to the invention.

In FIG. 10, finally, a plurality of guide means 20' are shown, which in FIG. 8 were only partially visible and which in this case are clearly visibly connected together via an upper web portion 21. On the open lower face 5 of the crossmember 2 of FIGS. 8 and 9, therefore, a guide means strip 20 is located, which partially closes the crossmember 2 and is partially unreleasably connected thereto, in particular thermally joined (not shown). Also the ends of the crossmember 2 are advantageously connected to the ends 24 of the guide means strip 20 and as a result at least partially closed. To this end, the ends are oriented upwards in the direction of the upper face 3 of the crossmember 2. The guide means strip 20 permits a maximum throughflow of air to the radiator, not shown, of the vehicle and additionally reinforces the otherwise open lower face 5 of the crossmember 2. It is also visible that in the transition region 18 of the crossmember 2 no guide means 20' are formed on the guide means strip 20 but the spacing a4 is present which is substantially larger than the spacing a5 between the guide means 20' in the central portion 19 of the crossmember 2.

Naturally, it is also conceivable that the guide means strip 20 is fastened to a closed crossmember 2. In this case, the strip may be designed to be relatively thin-walled, as the force-transmitting function of the guide means 20' during an impact with a vertical covering which is reduced or absent is substantially determined by the width B of the lower web portions 23 and the flank portions 22, and markedly less by the wall thickness W20 thereof itself.

List of Reference Numerals

1 Bumper system
2 Crossmember
3 Upper face
4 Rear face
5 Lower face
6 Front face
7 Partition
8 Deformation element
9 Deformation element
10 Guide means
10' Guide means with aperture
10" U-shaped guide means
11 Web portions
12,12' Flank portion
13 Flange
14 Aperture
15 Joint area
16,16' Longitudinal groove
17 End portion
18 Central portion
19 Transition portion
20 Guide means strip
20' Guide means
21 Upper web portion
22 Flank portion
23 Lower web portion
24 Additional wall
a1 Spacing
a2 Spacing
a3 Spacing
a4 Spacing
a5 Spacing
K Vehicle radiator region which is partially concealed by guide means
b1 Width of 10
b2 Width of 20
bk Width of K
H Height of 2
H1 Height in end portion
H2 Height in central portion
H3 Height of guide means 10, 20
Hk Height of K
W3 Wall thickness of 3
W4 Wall thickness of 4
W5 Wall thickness of 5
W6 Wall thickness of 6
W7 Wall thickness of 7
W20 Wall thickness of 20
α angle The invention is claimed is:

1. A bumper system for a vehicle comprising;
a crossmember arranged transversely to longitudinal members of the vehicle, wherein the crossmember comprises:
an upper face;
a lower face positioned opposite the upper face;
a front face interconnected to the upper face and the lower face; and
a rear face positioned opposite the front face and positioned proximate the vehicle, wherein the upper face, the lower face, the front face, and the rear face form a hollow profile; and
at least one guide means for introducing force into the crossmember, wherein the at least one guide means is arranged on at least one of the upper face and the lower face of the crossmember and extends from the crossmember in at least one of an upwardly direction and a downwardly direction, and wherein air is able to flow at least partially through a region adjacent the at least one guide means during travel.

2. The bumper system as claimed in claim 1, wherein the at least one guide means extends at least partially vertically from the at least one of the upper face and the lower face.

3. The bumper system as claimed in claim 1, wherein the at least one guide means does not protrude over the front face of the crossmember.

4. The bumper system as claimed in claim 1, wherein all guide means terminate substantially flush with the front face of the crossmember.

5. The bumper system as claimed in claim 1, wherein the at least one guide means is shaped as an integral component of the crossmember.

6. The bumper system as claimed in claim 1, wherein the at least one guide means is shaped at least partially as an extension of the front face.

7. The bumper system as claimed in claim 1, wherein the at least one guide means comprises a web portion and flank portions protruding from the web portion in a direction of the rear face of the crossmember.

8. The bumper system as claimed in claim 7, wherein the flank portions extend at an angle or in an arcuate manner away from the web portion, and wherein at least a portion of a length of the flank portions is in linear contact with at least one of the upper face and the lower face of the crossmember.

9. The bumper system as claimed in claim 7, wherein the flank portions are unreleasably connected to at least one of the upper face and the lower face of the crossmember by at least one of a material and a positive connection.

10. The bumper system as claimed in claim 1, wherein the crossmember comprises an aluminum alloy chosen from a group consisting of 5000, 6000, and 7000 series alloys according to EN 573-3.

11. The bumper system as claimed in claim 1, wherein the crossmember has at least one longitudinal groove at least on the front face.

12. The bumper system as claimed in claim 1, wherein the crossmember has at least on an end portion a first longitudinal groove on the upper face and a second longitudinal groove the lower face.

13. The bumper system as claimed in claim 1, wherein the at least one guide means is configured in one piece and extends in a longitudinal direction.

14. The bumper system as claimed in claim 13, wherein the guide means is an integral component of at least one of the upper face and the lower face of the crossmember, and wherein the guide means at least partially terminates the crossmember and at least partially protrudes therefrom at an angle extending at least one of upwardly and downwardly.

15. The bumper system as claimed in claim 13, wherein the at least one guide means is configured as an individual guide means strip, which is secured at least at particular points over an entire length of the crossmember on at least one of the upper face and the lower face thereof.

16. The bumper system as claimed in claim 15, wherein the guide means strip in a longitudinal section has a plurality of flank portions which alternately extend substantially rising and falling in at least one of a wave-shaped manner, a saw-tooth manner, or a manner of a rectangular function.

17. The bumper system as claimed in claim 1, wherein the upper face is substantially perpendicular to the front face, and wherein the front face is substantially parallel to the rear face.

18. The bumper system as claimed in claim 1, further comprising a horizontal partition interconnected to the front face and the rear face, wherein the crossmember is rectangular in cross section, and wherein the horizontal partition forms a double-chamber within the hollow profile of the crossmember.

19. A bumper system for a vehicle, comprising:
a crossmember arranged transversely to longitudinal members of the vehicle, wherein the crossmember includes:
an upper face;
a front face interconnected to the upper face; and
a rear face interconnected to the upper face, the rear face positioned opposite the front face and positioned proximate the vehicle, wherein the upper face, the front face, and the rear face form a U-shaped profile; and
a guide extending upwardly from the upper face of the crossmember for introducing force into the crossmember, the guide including:
a web portion positioned substantially flush with the front face of the crossmember;
a first flank portion extending from a first end of the web portion toward the rear face of the crossmember; and
a second flank portion extending from a second end of the web portion toward the rear face of the crossmember;
wherein a first aperture is formed at least one of within the web portion and between at least a portion of the guide and the upper face of the crossmember.

20. The bumper system as claimed in claim 19, comprising a second guide, wherein the second guide includes a web portion having an aperture, and wherein air is able to flow through the first aperture and the aperture in the web portion of the second guide.

* * * * *